(12) United States Patent
Dunn et al.

(10) Patent No.: US 7,734,577 B2
(45) Date of Patent: Jun. 8, 2010

(54) COMPOSITE USER INTERFACE AND FRAMEWORK

(75) Inventors: Melissa W Dunn, Woodinville, WA (US); Stephen J Mooney, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 342 days.

(21) Appl. No.: 11/853,111

(22) Filed: Sep. 11, 2007

(65) Prior Publication Data

US 2008/0052307 A1 Feb. 28, 2008

Related U.S. Application Data

(63) Continuation of application No. 10/883,139, filed on Jul. 1, 2004, now Pat. No. 7,480,664, which is a continuation-in-part of application No. 10/692,164, filed on Oct. 23, 2003, now abandoned.

(51) Int. Cl.
*G06F 12/00* (2006.01)
(52) U.S. Cl. .................. 707/608; 707/634; 709/248
(58) Field of Classification Search ............. 707/201, 707/608, 634; 709/248
See application file for complete search history.

(56) References Cited

U.S. PATENT DOCUMENTS

| 5,684,990 | A | 11/1997 | Boothby |
|---|---|---|---|
| 6,282,318 | B1 | 8/2001 | Dietrich et al. |
| 6,449,622 | B1 * | 9/2002 | LaRue et al. ................. 707/201 |
| 7,165,078 | B2 | 1/2007 | Lang et al. |
| 2003/0037112 | A1 * | 2/2003 | Fitzpatrick et al. .......... 709/205 |
| 2003/0069874 | A1 * | 4/2003 | Hertzog et al. ................. 707/1 |
| 2003/0126156 | A1 | 7/2003 | Stoltenberg et al. |
| 2005/0091250 | A1 | 4/2005 | Dunn et al. |
| 2005/0091284 | A1 | 4/2005 | Weissman et al. |

OTHER PUBLICATIONS

Final Office Action mailed on Oct. 18, 2006 for U.S. Appl. No. 10/692,164.

* cited by examiner

*Primary Examiner*—Hosain T Alam
*Assistant Examiner*—Reza Hosseini

(57) ABSTRACT

Computer-implemented methods of processing contact records are provided. A user may merge and unmerge contact records to control which records are synchronized with each other. Identity claims of records may be compared to identify possible duplicate records. Identity claims may include addresses, phone numbers, instant messenger addresses or other contact data that is likely to be uniquely associated with a contact. When possible duplicate contact records are found, a dialog box is displayed that identifies the possible duplicate records and includes an option for merging the possible duplicate contact records.

19 Claims, 14 Drawing Sheets

COMPOSITE USER INTERFACE AND FRAMEWORK

RELATED APPLICATIONS

This application is a continuation of U.S. application Ser. No. 10/883,139, filed Jul. 1, 2004, which is a continuation-in-part of application Ser. No. 10/692,164, filed Oct. 23, 2003.

BACKGROUND

Computer devices are increasingly being used to store contact data. It is not uncommon for a user to store contact data in devices and locations such as mobile phones, personal digital assistants (PDAs), laptop computers and servers connected to the Internet. Synchronization applications have been developed to help users synchronize contact dastored in different locations. For example, after updating a phone number stored in a mobile telephone, a particular synchronization application may be used to synchronize the updated phone number with contact data stored in an application such as Microsoft® Outlook®. The data stored in the same mobile phone may also be synchronized with a contact data stored in a proprietary contact application.

One of the common drawbacks associated with storing data, such as contact data, in several different devices and locations is that it is common to have inconsistent data. For example, a user may update a friend's phone number stored on a mobile phone and update the same friend's address stored in a laptop computer. Several weeks later the user may not remember if the phone number stored in the mobile phone or the laptop computer is the most current number. Another common drawback associated with current systems and methods is that users may have redundant data. For example, a user may store a phone number and home address in a contact application under the name Tom Smith and store a work email address and home address under the name Thomas Smith. This results in partial contact information being included in two different records.

Therefore, there is a need in the art for systems and methods that increase the consistency of contact data stored in multiple devices and in multiple locations. There is also a need in the art systems and methods that reduce the amount redundant contact data.

BRIEF SUMMARY

Aspects of the present invention address one or more of the issues mentioned above, thereby providing systems and methods that increase the consistency of contact data stored in multiple devices and reduce the amount of redundant contact data. A contact database stores a plurality of contact records. Related contact records are linked together so that updating one record results in the updating of the related records. A graphical user interface allows users to merge linked records. The unmerge command may result in the creation of a new composite record and the re-linking of related contact records.

BRIEF DESCRIPTION OF THE DRAWINGS

Aspects of the present invention are described with respect to the accompanying figures, in which like reference numerals identify like elements, and in which.

DETAILED DESCRIPTION

Exemplary Operating Environment

Figure 1:
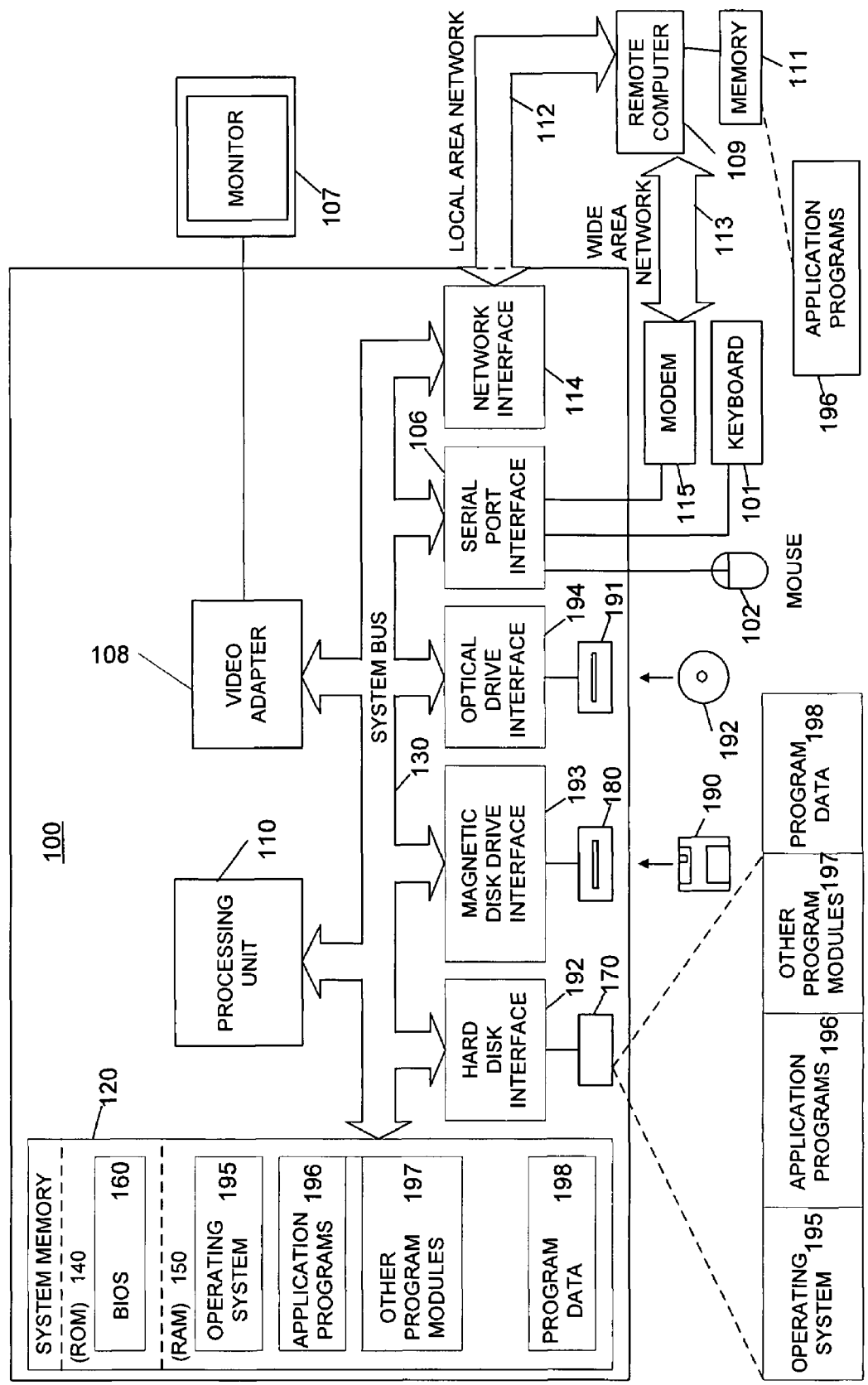
FIG. 1 shows a functional block diagram of a conventional general-purpose computer system.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Description of Illustrative Embodiments

Figure 2:
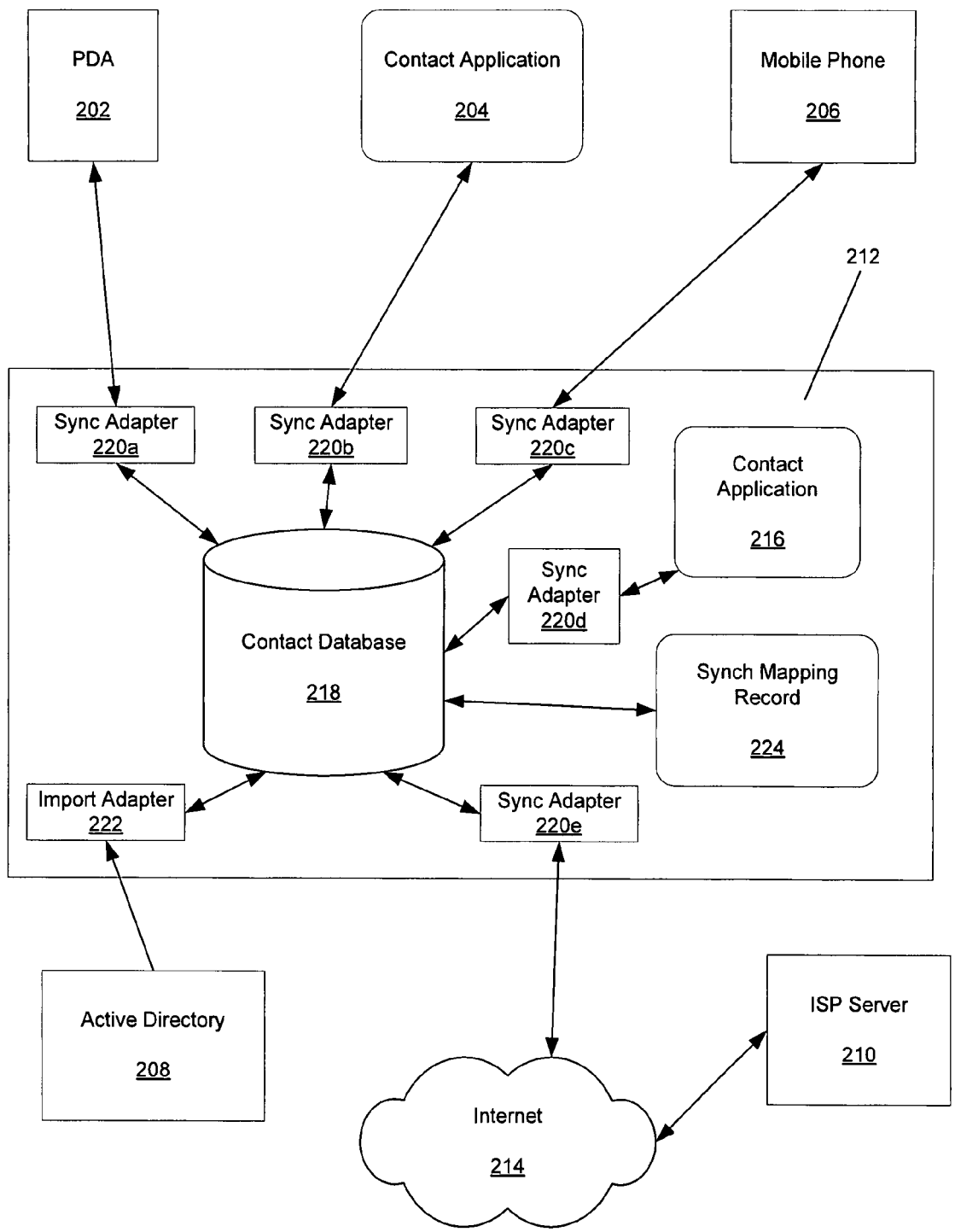
FIG. 2 illustrates a system for synchronizing data stored in a plurality of stores.

FIG. 2 illustrates a system for synchronizing data stored in a plurality of stores. As used herein, a store may be in the form of a device or a file that may be accessed by an application. The system shown in FIG. 2 includes remote stores implemented with a personal digital assistant 202, a contact application 204, a mobile phone 206, Active Directory 208 and Internet service provider server 210. Remote stores 202, 204 and 206 may be connected directly to a computer device 212. The connections may be via one or more docking cradles, USB cables, infrared links or any other conventional mechanism used to connect a device to a computer device. Remote stores 208 and 210 may be connected to computer device 212 via the Internet 214. Computer device 212 may include one or more internal stores, such as contact application 216. In one embodiment, contact application 216 is implemented with Microsoft® Outlook®. One skilled in the art will appreciate that embodiments discussed herein are not limited to the stores and data connections shown in FIG. 2.

Computer device 212 includes a contact database 218 for storing contact information. Contact information may include names, addresses, phone numbers, email addresses, instant messenger identifications, etc. In alternative embodiments, contact database 218 may also store other data, such as digital certificates, passwords, playlists, data files or any other data that a user wishes to synchronize with a store. Moreover, the function of the single database 218 may be performed with two or more databases. For example, a first database may store contact data and a second database may store playlists.

A plurality of synchronization adapters 220a-220e are used to synchronize data stored in contact database 218 and stores 202, 204, 206, 210 and 216. One skilled in the art will appreciate that structure of any particular synchronization adapter may be a function of the type of store and an application programming interface (API) that is used to access data stored in contact database 218. One or more stores may be configured to not allow a user to manage data stored in that store. Active Directory 208, for example, allows users to read data, but not to write data. Active Directory 208 may be connected to computer device 212 via an import adapter 222. Import adapter 222 is used to transfer data from Active Directory 208 to contact database 218.

A synchronization mapping record 224 may include rules, constraints or other information that governs the synchronization of data. For example, if mobile phone 206 only allows a user to store two phone numbers per name, a constraint in synchronization mapping record 224 may prevent more than two phone numbers per name from attempting to be synchronized with the data stored in mobile phone 206.

Figure 3:
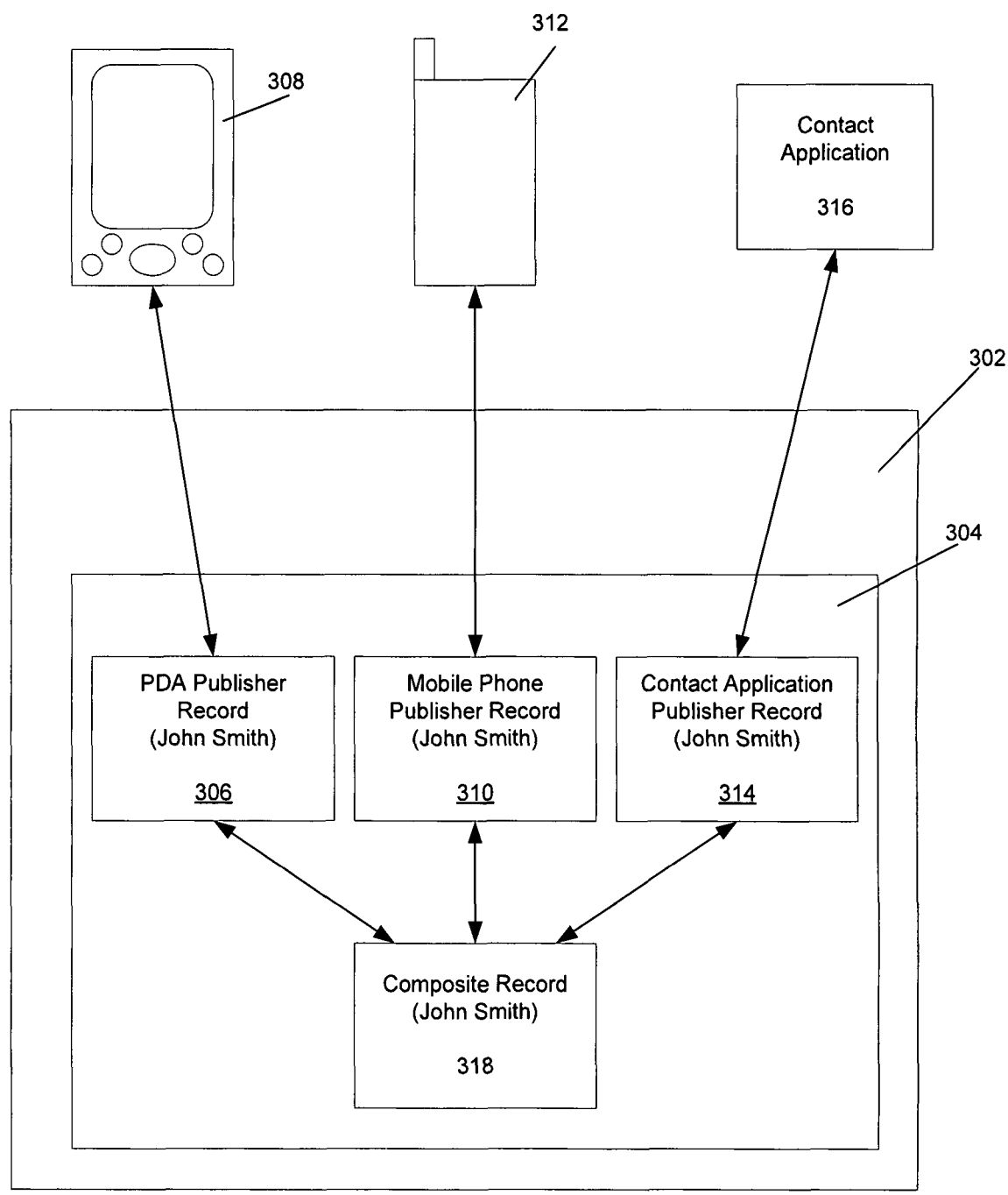
FIG. 3 illustrates a system that may be used to synchronize data with three stores and a database.

FIG. 3 illustrates a system that may be used to synchronize data with three stores and a database. A computer device 302 may be similar to computer device 212. Computer device 302 includes an operating system 304. A PDA publisher record 306 includes contact data that is synchronized with a PDA 308. A mobile phone publisher record 310 includes contact data that is synchronized with a mobile phone 312. A contact application publisher record 314 includes contact data that is synchronized with a contact application 316. In the embodiment shown, publisher records 306, 310 and 314 include contact data for a contact named "John Smith."

PDA publisher record 306, mobile phone publisher record 310 and contact application publisher record 314 each synchronize with a composite record 318. Publisher records 306, 310 and 314 and composite record 318 may be included within contact database 218 (shown in FIG. 2). In an exemplary implementation, a user may update John Smith's contact information stored in PDA 308. Synchronizing PDA 308 with computer device 302 causes PDA publisher record 306 to include the updated contact information. The updated contact information is then synchronized with composite record 318. Composite record 318 may then be synchronized with mobile phone publisher record 310 and contact application publisher record 314. The next time that mobile phone 312 is synchronized with computer device 302, the contact data stored in mobile phone 312 is synchronized with mobile phone publisher record 310. The contact data stored in contact application 316 may be synchronized in a similar manner. Of course, composite record 314 may be synchronized with a plurality of additional publisher records, which will lead to the synchronization of data stored in additional stores.

In the embodiment shown in FIG. 3, records 306, 310, 314 and 318 are shown located within operating system 304. One of the advantages of locating the records within an operating system is that the number of APIs required to update data stored in several different stores can be minimized. In one embodiment, a single API is used to manage the data stored within publisher records, such as PDA publisher record 306, mobile phone publisher record 310 and contact application publisher record 314. This is in contrast to prior art systems in which a given store might be required to use one API for synchronizing data with data stored in a first application, a second API for synchronizing data with data stored in a second application, and so on.

Figure 3A:
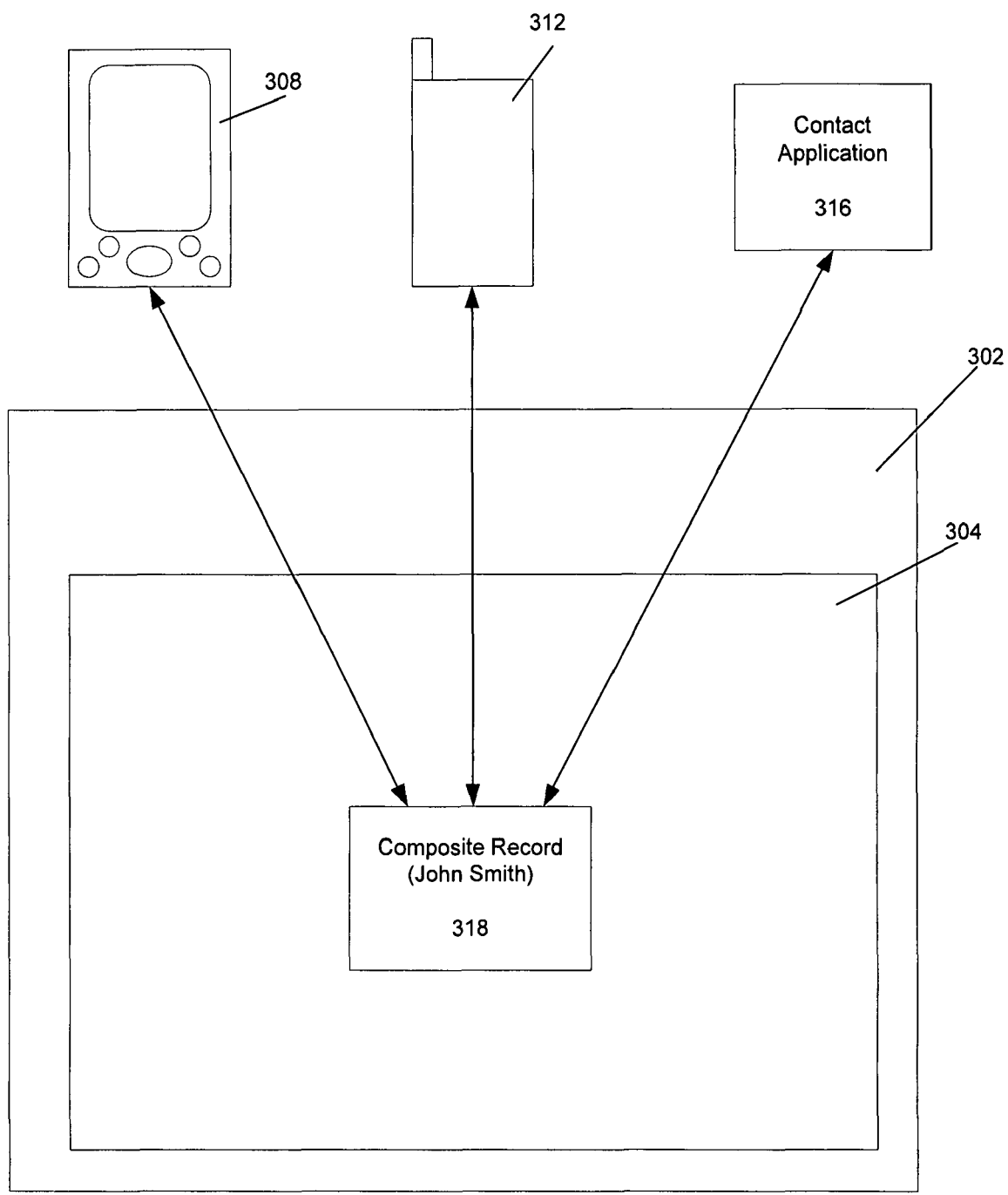
FIG. 3a illustrates another system that may be used to synchronize data with three stores and a database.

FIG. 3a illustrates another system that may be used to synchronize data with three stores and a database. A computer device 302 may be similar to computer device 212. Computer device 302 includes an operating system 304.

Instead of synchronizing contact information with a publisher record, the three data stores synchronize directly with a composite record 318. In an exemplary implementation, a user may update John Smith's contact information stored in PDA 308. Synchronizing PDA 308 with computer device 302 causes the contact information to be synchronized with composite record 318. Thus, the next time that mobile phone 312 is synchronized with computer device 302, the contact data stored in mobile phone 312 is synchronized with composite record 318. The contact data stored in contact application 316 may be synchronized in a similar manner. Of course, composite record 314 may be synchronized with the data stored in a plurality of additional stores.

Figure 4:
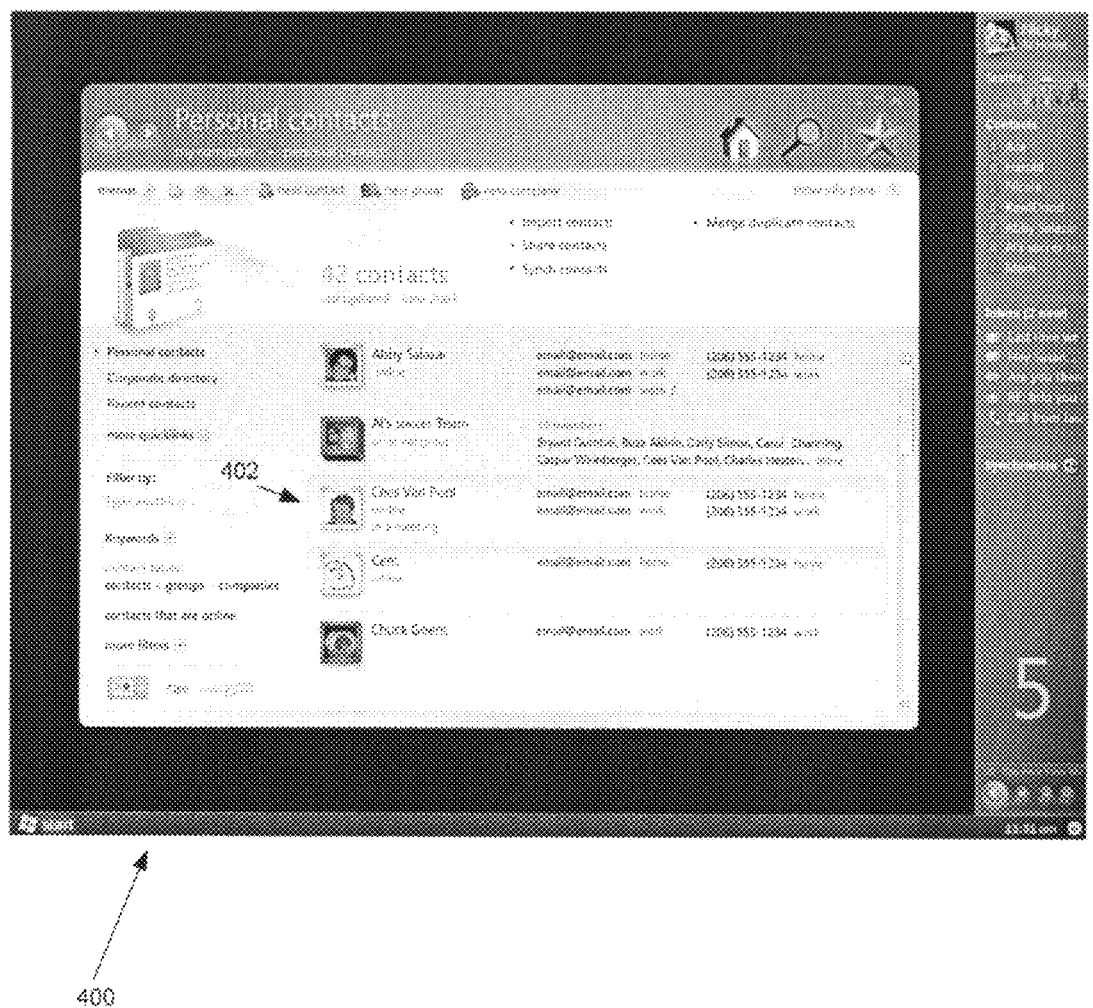
FIG. 4 illustrates a graphical user interface that shows contact data for a plurality of contacts.
Figure 5:
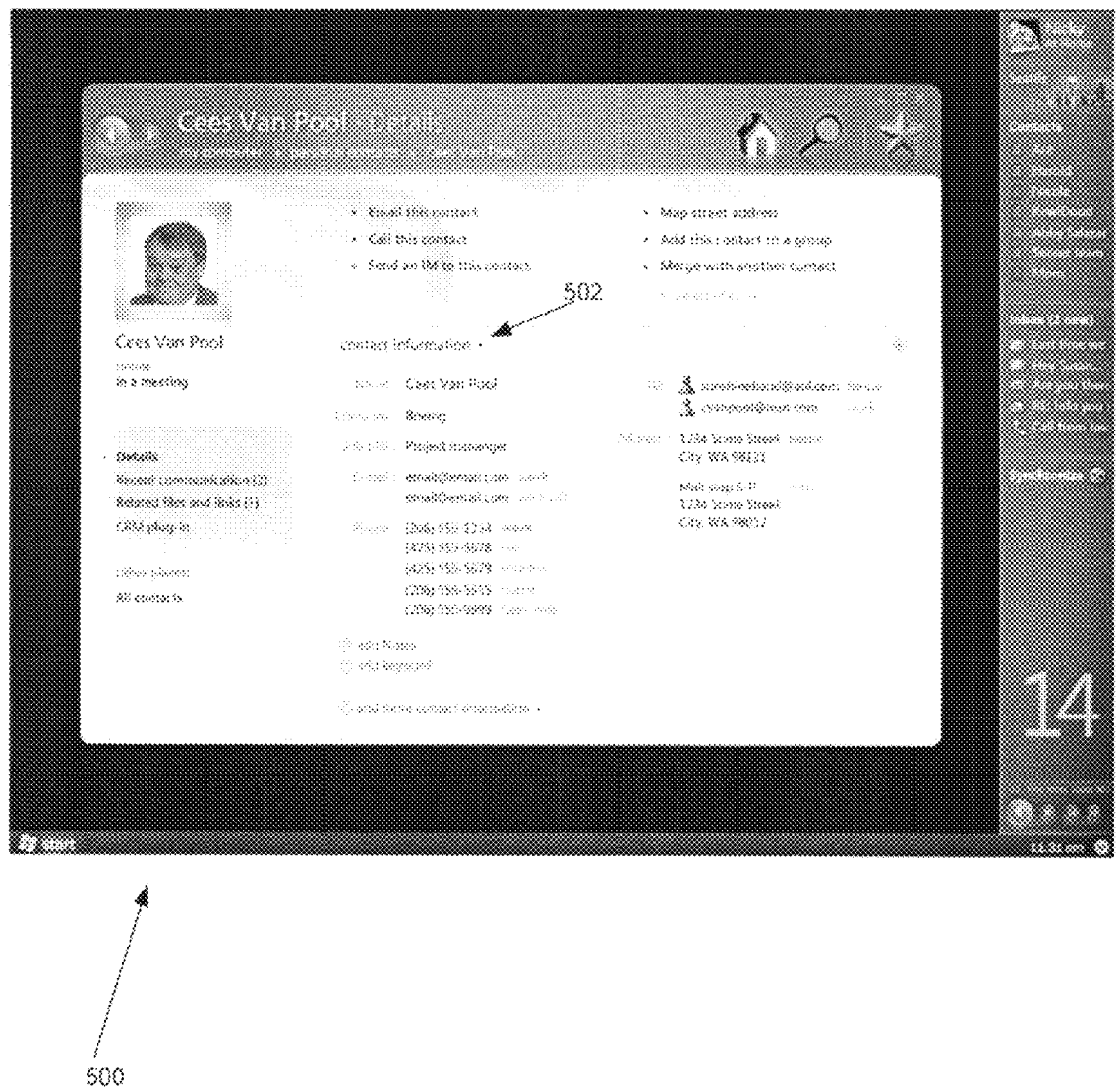
FIG. 5 illustrates a user interface that includes contact data stored in a composite record.
Figure 6:
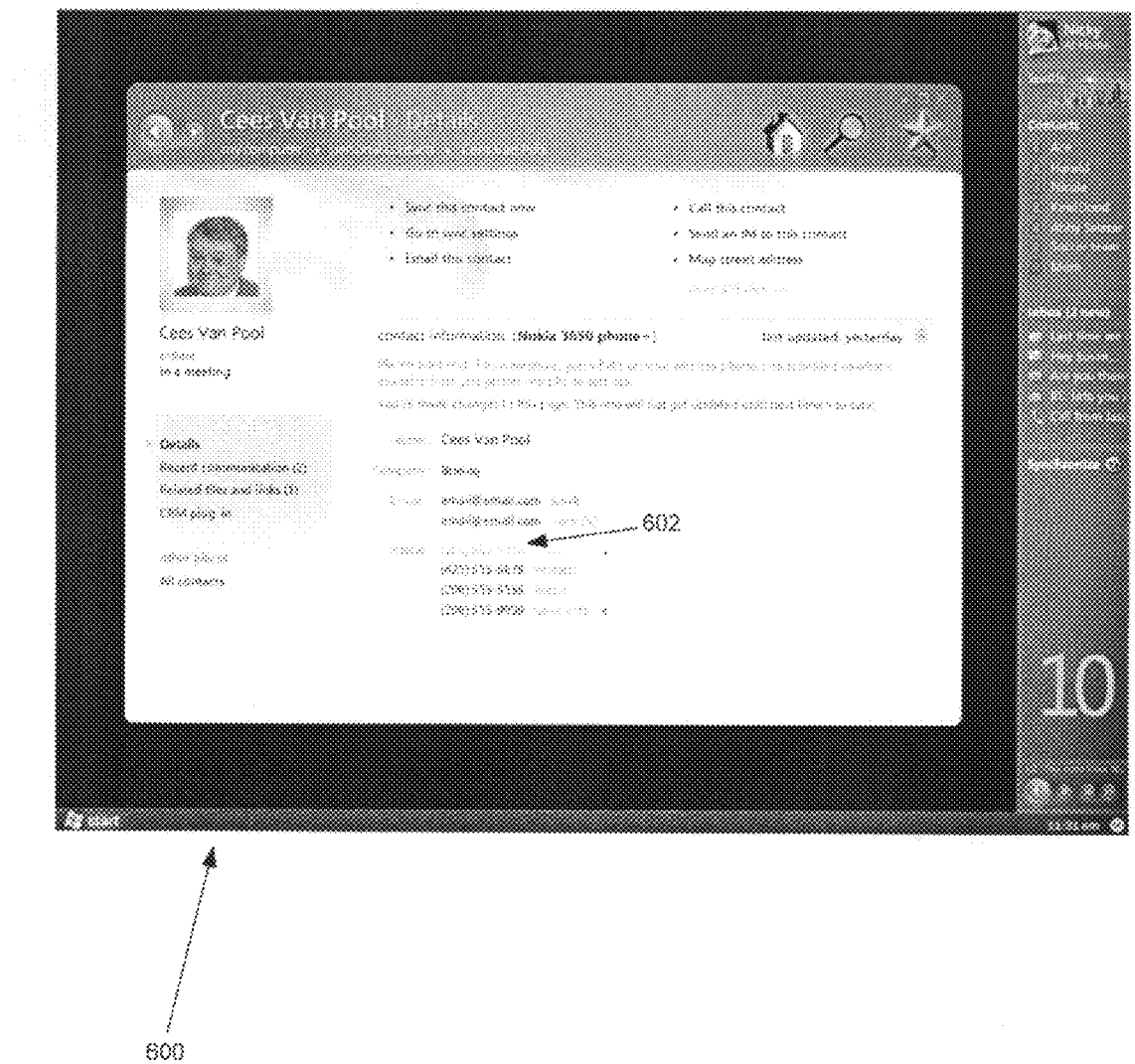
FIG. 6 illustrates a user interface that includes contact data stored in a mobile phone publisher record.

FIG. 4 illustrates a graphical user interface 400 that shows contact data for a plurality of contacts. Additional contact information may be displayed by selecting a particular contact. For example, selecting contact 402 causes a graphical user interface 500 (shown in FIG. 5) to be displayed. User interface 500 may include all of the contact data stored in a composite record. A drop down menu 502 may be used to select graphical user interfaces that display contact data stored in publisher records. User interface 600 (shown in FIG. 6) includes contact data stored in a mobile phone publisher record. User interface 600 may also include contact data that is stored in a composite record, but not in the corresponding publisher record, if it exists. Field 602, for example, is displayed in a faded font to indicate that the field is not included in the publisher record. Icons or other formatting options may also be used to indicate which fields are not included within a publisher record. The mobile phone that corresponds to user interface 600 may only be capable of storing 3 phone numbers per contact. As a result, the phone number in field 602 is not synchronized with the data in the mobile phone and may not be included within the mobile phone publisher record.

Figure 7:
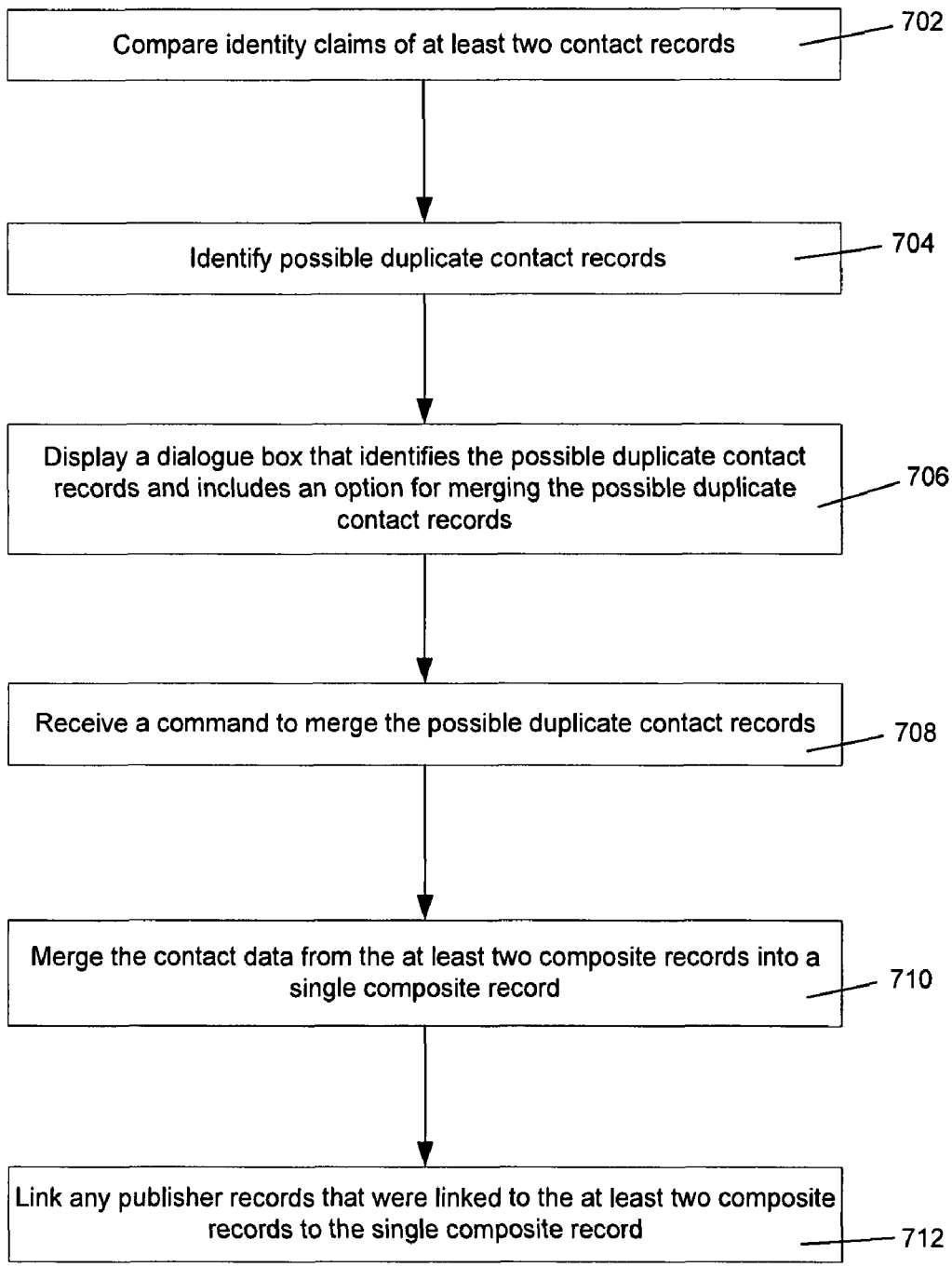
FIG. 7 illustrates a computer-implemented method of merging duplicate contact records.

FIG. 7 illustrates a computer-implemented method of merging duplicate contact records. Duplicate contact records may result from user synchronizing contact data from different stores. For example, a user may store contact data in a mobile phone and identify the contact as John Smith. Additional contact data may be stored in PDA which identifies the contact as Jonathan Smith. First, in step 702 identity claims of at least two contact records are compared. The contact records may include various combinations of publisher records and composite records. Identity claims may include phone numbers, addresses or other information that is likely to uniquely identify a contact. The example given above shows that names are not good identity claims because it is common to have minor variations in names.

Figure 8:
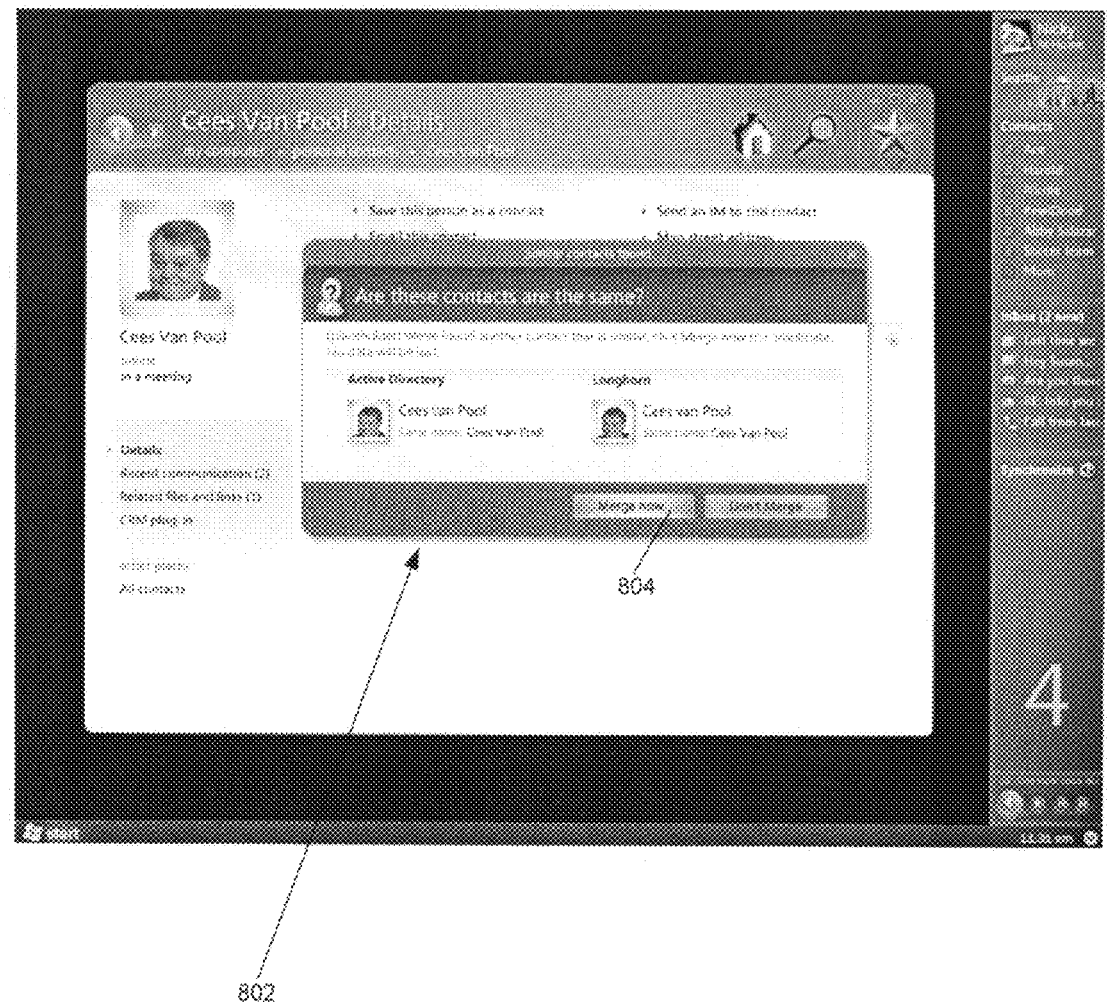
FIG. 8 illustrates an exemplary dialog box for unmerging records.

In step 704 possible duplicate contact records are identified. Possible duplicate contact records may correspond to contact records having the same identity claims. In step 706 a dialog box is displayed that identifies the possible duplicate contact records and includes an option for merging the possible duplicate contact records. FIG. 8 illustrates an exemplary dialog box 802. Dialog box 802 identifies the stores that are the sources of possible duplicate contact records. Dialog box 802 may also list the contact data that is the same for each of the contact records. For example, dialog box 802 may display the identity claims that resulted in the contact records being identified as possible duplicates.

In step 708 a command to merge the possible duplicate records is received. The user may select merging now button 804 to cause contact records to be merged. In steps 710, the contact data from the at least two composite records is merged into a single composite record. For example, if one composite record corresponds to a contact identified as John Smith and a second composite record corresponds to a contact identified as Jonathan Smith, the contact data from both records would be merged into a single composite record that identify the contact with a single name. Finally, in step 712, the publisher records that were linked to the original composite records are linked to the single composite record. Re-linking the publisher records to the composite record ensures that contact data will be synchronized appropriately.

Figure 7A:
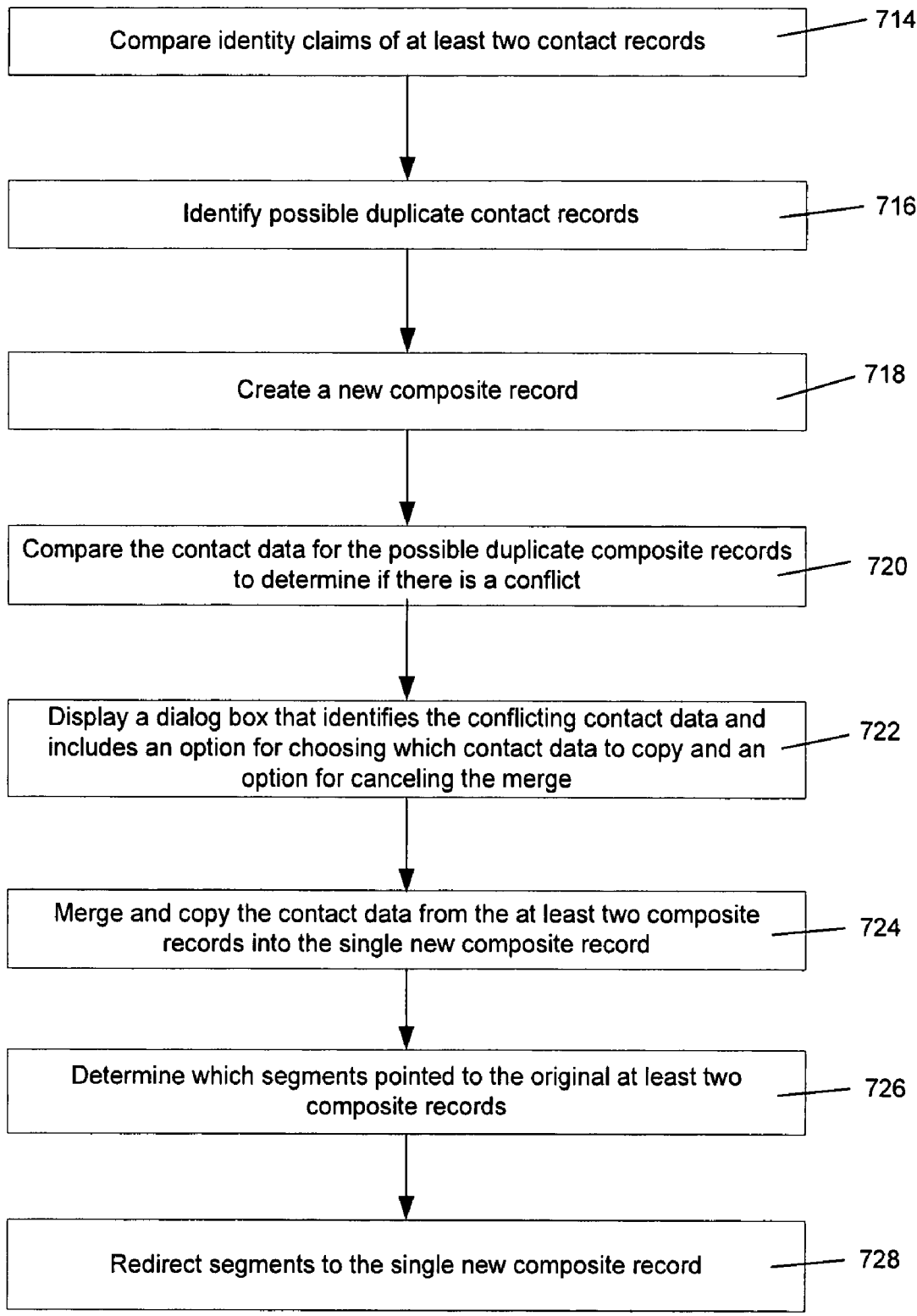
FIG. 7a illustrates a computer-implemented method of merging duplicate contact records.
Figure 12:
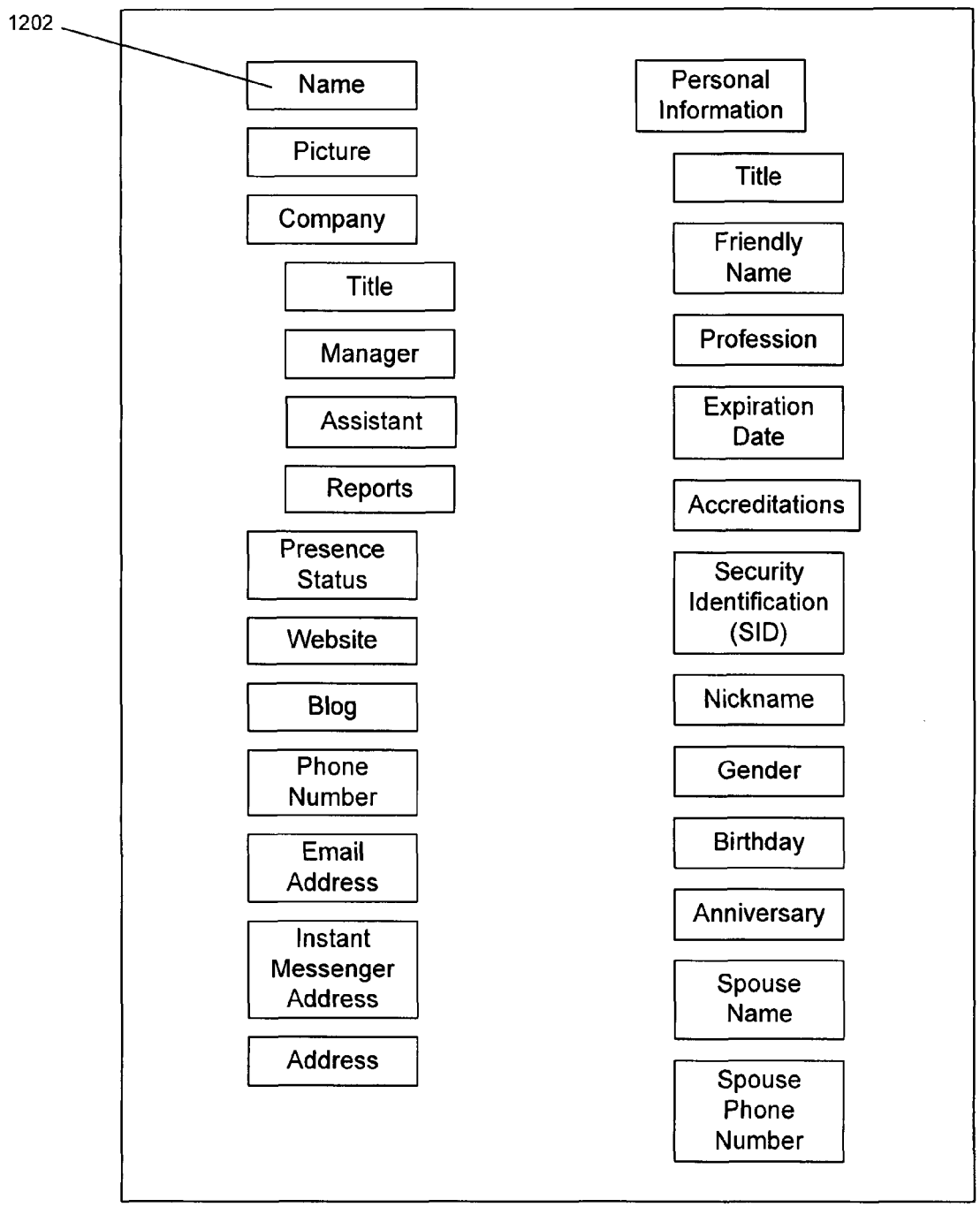
FIG. 12 illustrates an exemplary contact record schema.

FIG. 7a illustrates a computer-implemented method of merging duplicate contact records. First, in step 714 identity claims of at least two contact records are compared. The contact records may include various combinations of composite records. Identity claims may include phone numbers, addresses or other information that is likely to uniquely identify a contact. FIG. 12 identifies exemplary types of identity claims that may be identified for a given contact. Name identity claim 1202 represents an exemplary identity claim. The example given above shows that names are not good identity claims because it is common to have minor variations in names. The data shown in FIG. 12 may be arranged in accordance with a markup language schema, such as an XML schema, to facilitate parsing, organizing, searching, etc.

In step 716 possible duplicate contact records are identified. Possible duplicate contact records may correspond to contact records having the same identity claims. FIG. 8 illustrates an exemplary dialog box 802. Dialog box 802 identifies the stores that are the sources of possible duplicate contact records. Dialog box 802 may also list the contact data that is the same for each of the contact records. For example, dialog box 802 may display the identity claims that resulted in the contact records being identified as possible duplicates.

In step 718 a new composite record for the duplicate records may be created. The data from the duplicate contact records, i.e. the composite records for the duplicate records, will be merged into the new composite record. Alternatively, a composite record may be modified to incorporate data included in another contact record. That is, the data from two or more composite records may be combined without creating a new composite record. In step 720 the contact data for the duplicate records is compared so that any conflicts in the duplicate contact records can be resolved. For example, if one composite record corresponds to a contact identified as John Smith and a second composite record corresponds to a contact identified as Jonathan Smith, the records may be duplicates but would have conflicting identity claims. Once the conflict is resolved, the contact data from both records would be merged into a new composite record that identifies the contact with a single name.

Figure 10:
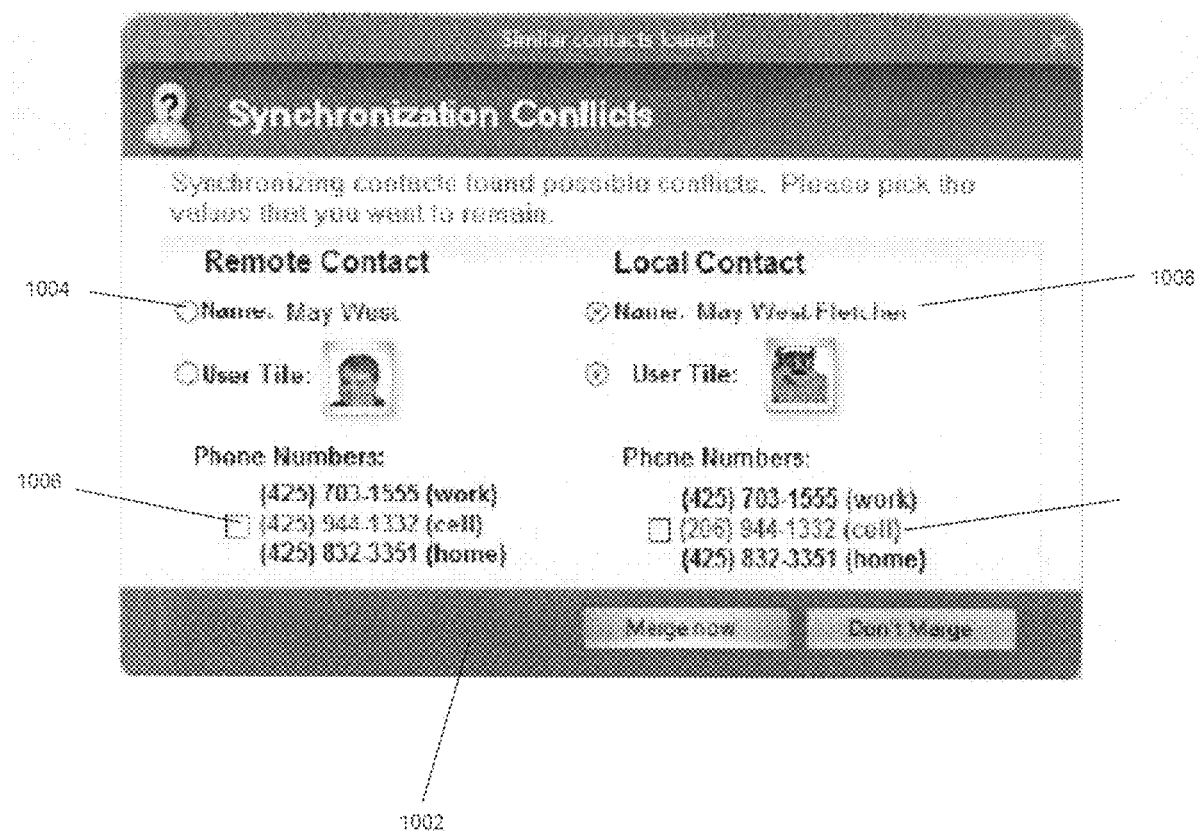
FIG. 10 illustrates an exemplary dialog box for resolving conflicts in duplicate contact records.

In step 722, a dialog box may be displayed to the user identifying conflicting data in the duplicate contact records, e.g. a conflicting contact name as described above, and the user is given an option to choose which contact name should be used for the new contact record or to cancel the merge all together. An exemplary dialog box is depicted in FIG. 10. Once the user resolves the conflicting data as described, the data from the duplicate contact records is copied (or merged) into the single new composite record.

Finally, in steps 726 and 728, any data stores that pointed to the original composite records are linked or redirected to the single or new composite record. Re-linking the data stores to the new composite record ensures that contact data will be synchronized appropriately.

In another embodiment of merging contact records, contact data is merged to form a union of properties. For example, the contact data of one contact record may contain the phone number "(206) 123-4567" and the contact data of a second contact record may contain the phone number "123-4567 (home)." According to the embodiment, the phone numbers would be merged to show a union of properties, "(206) 123-4567 (home)" as the resulting phone number.

Figure 9:
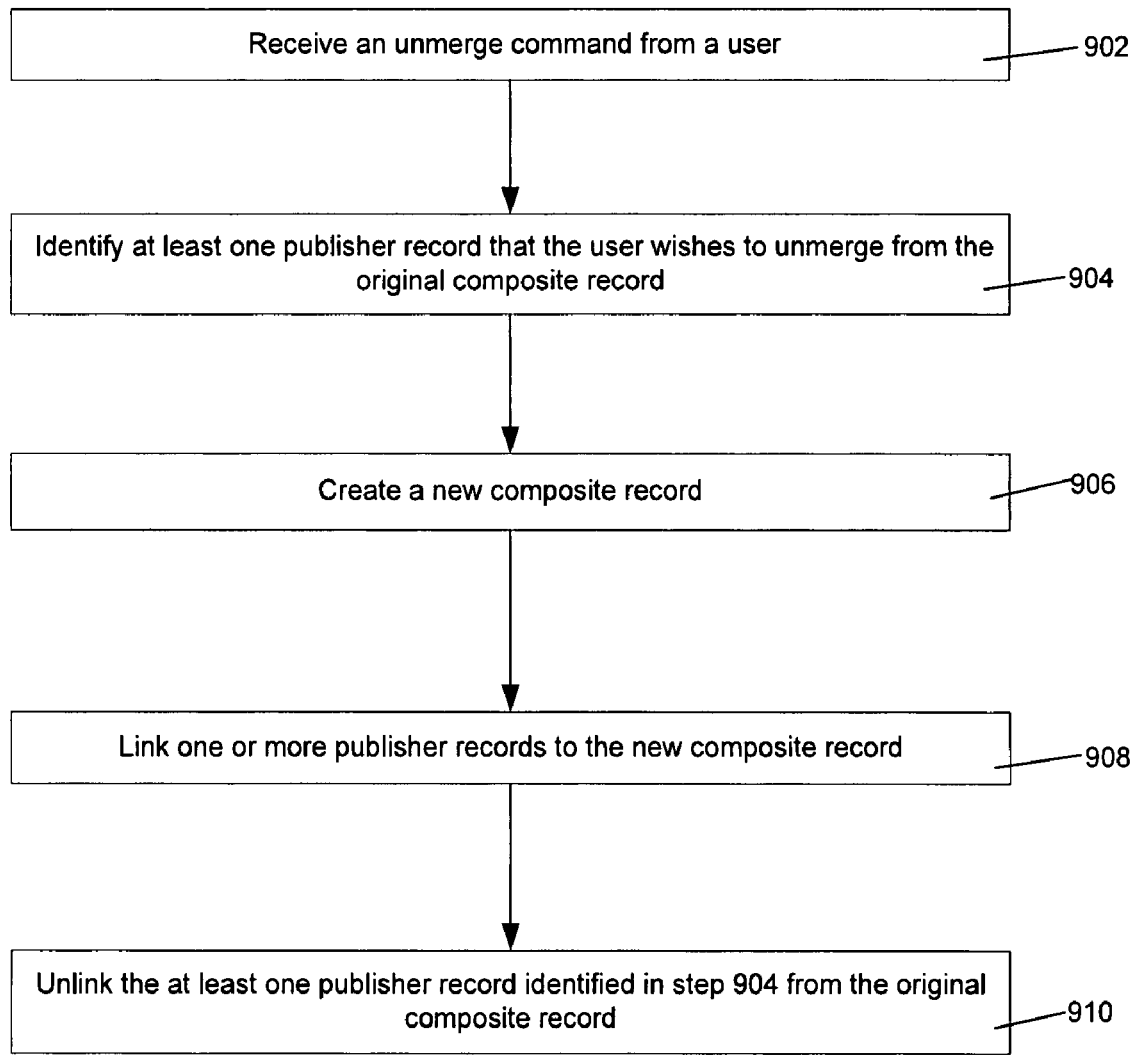
FIG. 9 illustrates a computer-implemented method for unmerging contact data records.

FIG. 9 illustrates a computer-implemented method for unmerging contact data records. It may be desirable to unmerge contact records when a user mistakenly merges two contact records. First, in step 902, an unmerge command is received from a user. A user may provide an unmerge command by making an appropriate selection in a user interface, such as user interface 500 shown in FIG. 5. In step 904 at least one publisher record that a user wishes to unmerge from a composite record is identified. Referring to the embodiment shown in FIG. 3, step 904 may include identifying a publisher record, such as contact application publisher record 314. In step 906 a new composite record is created. One or more publisher records are linked to the new composite record in step 908. The publisher records that are linked to the new composite record are the publisher records that are unmerged. Next, in step 910 the unmerged publisher records that are identified in step 904 are unlinked from the original composite record. Steps 908 and 910 result in the unmerged publisher records properly synchronizing with a new composite record instead of synchronizing with the original composite record.

FIG. 10 represents an exemplary dialog box 1002 for resolving conflicts in identity claims. As discussed above, contact records can be duplicates but still contain conflicting identity claims. For example, the duplicate records identified in dialog box 1002 have conflicting names "May West" 1004 and "May West-Fletcher" 1008.

Figure 11:
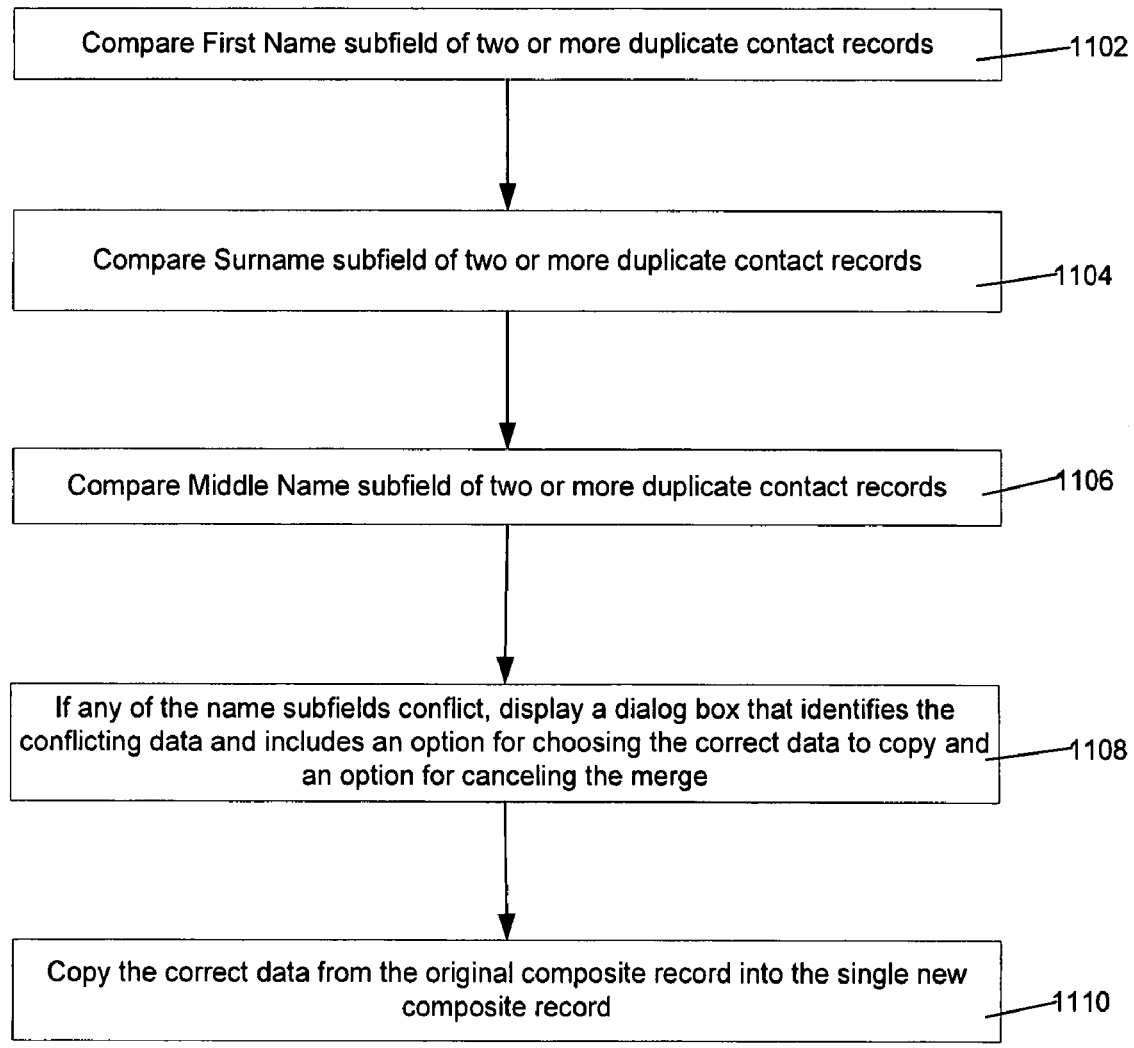
FIG. 11 illustrates a computer-implemented method for resolving conflicts in duplicate contact records.

FIG. 11 represents an exemplary computer-implemented method for resolving conflicting name identity claims. In duplicate contact records, such as exemplified in dialog box 1002 certain subfields (i.e. First Name, Middle Name, or Surname) may conflict. First, in step 1102, the First Name subfields of the duplicate contact records are compared to determine if the entries conflict. For example, First Name "May" 1004 would be compared to First Name "May" 1008, and the First names would be determined not to be in conflict. Next, in steps 1104 and 1106 the remaining subfields are compared to identify conflicting entries. For example, Surname "West" 1004 would be compared to Surname "West-Fletcher" 1008, and the Surnames would be determined to be in conflict.

In step 1108, if any of the subfields within the duplicate contact records were identified as conflicting, a dialog box 1002 may be displayed to allow the user to choose the correct data to be included in a merged composite record for the duplicate contact records. Finally, the correct data from the duplicate contact records may be copied or merged into a single composite record in step 1110. Of course, step 1110 may alternatively include merging data into a single existing record. The method described in FIG. 11 can similarly be used for resolving conflicts in other types of identity claims such as conflicting phone numbers and addresses. It is further noted that some embodiments of the present invention may contain processes to automatically resolve conflicting identity claims such that no user interaction is required.

The description above has been given in terms of preferred and exemplary embodiments. Numerous other embodiments, modifications and variations within the scope and spirit of the appended claims will occur to persons of ordinary skill in the art from a review of this disclosure.

We claim:

1. A method for managing contact records at a host computing device, where each contact record represents a single individual person and comprises contact fields for information about that person including a name field, one or more phone number fields, and address or email fields, the method comprising:

executing on the host computing device a contacts synchronization system, the contacts synchronization system configured to allow devices storing contact records to connect with the host computing device and synchronize the contact records thereon with a data store on the host computing device, the contacts synchronization system storing a first set comprised of contact records, or links thereto, received from a first device that synchronized with the contacts synchronization system, and storing a second set comprised of contact records, or links thereto, received from a second device that synchronized with the contacts synchronization system;

forming composite contact records from the first and second sets of contact records and storing the composite contact records in the data store, wherein a composite contact record comprises a composition of contact fields in a first contact record in the first set and contact fields in a second contact record in the second set, the first and second contact records both storing contact information about a same person, and storing information linking the composite contact record with the first and second contact records;

displaying the composite contact record including its contact fields in a display area including a user interface element that allows a user to choose either the first or second device as a current selection, where when one of the devices is selected as the current selection, contact fields of the corresponding contact record are displayed with an appearance that distinguishes them from displayed contact fields corresponding to the unselected device, receiving user edits entered via the display area and modifying and storing the composite contact record accordingly, where the composite contact record is maintained such that user edits to contact fields common to the first and second contact records are propagated from the composite contact record to the first and second computing devices upon synchronization thereof with the contacts synchronization system, and user edits to contact fields in the composite record from the first contact record but not from the second contact record are propagated from the composite contact record upon synchronization to the first computing device but not the second computing device.

2. A method according to claim 1, further comprising:

displaying the composite contact record at the host computing device in a way that allows user editing of the contact data that is from the first contact record but is not from the second contact record and in a way that does not allow user editing of the contact data that is not from the first computing device.

3. A method according to claim 1, wherein user edits to contact fields in the composite record from both the first contact record and the second contact record are propagated upon synchronization to the first and second computing device.

4. A method according to claim 1, wherein the composite contact record includes links to copies of the first and second contact records maintained at the host computing device and the links are used to propagate to the copies changes that are made to the composite contact record.

5. A method according to claim 4, wherein the changes to the composite contact record are propagated to the first and/or second computing device by synchronizing the copies with the first and/or second computing device.

6. A method according to claim 1, further comprising displaying a list of composite contact records and the displaying of the composite contact record in the display area is responsive to a user selection of the composite contact record from the list of composite contact records.

7. A computing device configured to be capable of performing a process and having thereon a contact synchronization system for synchronizing contact records between the computing device and other computing devices, where each contact record represents a single individual person and comprises contact fields for information about that person including a name field, one or more phone number fields, and address or email fields, the process comprising:
   receiving a first contact record from a first computing device, the first contact record comprising first contact information about a specific person, the first contact record being received responsive to the first computing device synchronizing with the contact synchronization system;
   receiving a second contact record from a second computing device, the second contact record comprising second contact information about the specific person, the second contact record being received responsive to the second computing device synchronizing with the contact synchronization system;
   displaying a composition of the first contact information and the second contact information that includes one or more contact fields that are unique to the first contact record, one or more contact fields that are unique to the second contact record, and contact fields that are common to the first and second contact records; and
   displaying the composition to allow a user to edit the composition such that changes to the one or more contact fields that are unique to the first contact record are synchronized to the first contact record on the first computing device when the first computing device is next synchronized with the contacts synchronization system, and changes to the one or more contact fields that are common to the first and second contact records are synchronized to both the first and second computing devices when they are next synchronized with the contact synchronization system.

8. A computing device configured according to claim 7, the process further comprising:
   displaying a user interface element that allows a user to select the first computing device or the second computing device; and
   responsive to user selection of the first computing device, displaying at least some of the composition of the first contact information and the second contact information in a way that visibly distinguishes the one or more contact fields from the first computing device that are not found in the second contact record from the displayed one or more contact fields that that are from the second computing device.

9. A computing device configured according to claim 7, wherein either contact fields from the first contact record or contact fields from the second data record are editably displayed in accordance with whether the first or second computing device is selected by the user.

10. A computing device configured according to claim 7, wherein the composition further comprises a third contact record from a third computing device, and as either the first, second, or third computing device is selected by a user, contact information in the composition that is unique to such selected device is displayed in a way that visibly distinguishes it from other contact information in the composition.

11. A computing device according to claim 7, wherein the process further comprises displaying a plurality of composite contact records and displaying the composition of the first and second contact records in response to selection of same from among the plurality of composite contact records.

12. A computing device according to claim 7, wherein the process further comprises displaying the composition of the first and second contact records such that the composition appears as a single contact record.

13. A computing device according to claim 12, wherein the process further comprises allowing editing of only contact fields unique to either the first or second computing device in accordance with a current computing device selection.

14. A computing device according to claim 7, wherein the displaying the composition further comprises visibly differentiating contact fields of the composition in accordance with a selection of the first or second computing device.

15. One or more computer readable storage storing information to enable a host computing device to be capable of performing a process of managing contact records corresponding to a plurality of computing devices, the process being performed by a contacts synchronization system executing on the host computing device, the contacts synchronization system configured to allow devices storing contact records to connect with the host computing device and synchronize the contact records thereon with a data store on the host computing device, where each contact record represents a single individual person and comprises contact fields for information about that person including a name field, one or more phone number fields, address fields, and one or more email fields, the process comprising:
   storing, by the contacts synchronization system on the host computing device, a first plurality of contact records or links thereto received from a first computing device when the first computing device synchronized with the contacts synchronization system, where a first contact record in the first plurality of contact records comprises a first set of contact fields containing contact information for a specific person;
   storing, by the contacts synchronization system on the host computing device, a second plurality of contact records or links thereto received from a second computing device when the second computing device synchronized with the contacts synchronization system, where a second contact record in the first plurality of contact records comprises a second set of contact fields containing contact information for the specific person, where the second set of contact fields has a first-device-specific contact field containing contact information for the specific person that is not included in the first plurality of contact fields, where the first set of contact information has a second-device-specific contact field containing contact information for the specific person that is not included in the second plurality of contact fields, and where the first and second set of contact fields both have a common contact field containing same contact information about the specific person;

generating a plurality of composite contact records by linking contact records in the first plurality of contact records with corresponding contact records in the second plurality of contact records, including generating a composite contact record of the specific person that includes the first-device-specific contact field, the second-device-specific contact field, and the common contact field;

receiving user input identifying the first computing device or the second computing device; and responsive to receiving the input, displaying the composite contact record based on which of the computing devices was identified by the user input, including displaying the first-device-specific contact field, the second-device-specific contact field, and the common contact field.

16. One or more computer readable storage according to claim 15, the process further comprising displaying the composite contact record such that, in accordance with the user input, either the first-device-specific field or the second-device-specific field can be edited.

17. One or more computer readable storage according to claim 15, the process further comprising storing changes to the composite contact record in local copies of the first contact record and the second contact record, and propagating the changes to the corresponding contact records on the first and second device the next time they synchronize with the contacts synchronization system.

18. One or more computer readable storage according to claim 17, the process further comprising using the local copy of the first contact record to update the first contact record on the first computing device.

19. One or more computer readable storage according to claim 15, the process further comprising identifying the first and second contact records as possibly corresponding to the same specific person and enabling a user to indicate whether the first and second contact records should be merged, and in response forming the composite contact record.

* * * * *